United States Patent

Child et al.

(10) Patent No.: US 6,576,574 B2
(45) Date of Patent: Jun. 10, 2003

(54) AIRBAG COATINGS COMPRISING MICROSPHERES PROVIDING IMPROVED THERMAL RESISTANCE

(75) Inventors: Andrew D. Child, Spartanburg, SC (US); Derek S. Kozlowski, Greer, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 09/437,168

(22) Filed: Nov. 10, 1999

(65) Prior Publication Data

US 2002/0061691 A1 May 23, 2002

(51) Int. Cl.[7] .......................... B32B 27/22; B60R 21/16
(52) U.S. Cl. .............................. 442/76; 442/68; 442/70; 442/74; 442/104; 442/164; 442/168; 442/182; 442/284; 280/728.1; 383/3; 428/34.1; 428/34.3; 428/34.5; 428/35.2; 428/35.4; 428/35.7; 428/35.9; 428/36.1; 428/36.2; 428/36.6; 428/36.91; 428/402
(58) Field of Search ................................. 428/328, 322, 428/405, 406, 34.1, 34.3, 34.5, 35.2, 35.4, 35.7, 35.9, 36.1, 36.2, 36.6, 36.91, 402–402.22, 403–407; 442/76, 148, 68, 70, 74, 104, 164, 168, 182, 284; 280/728.1; 383/3

(56) References Cited

U.S. PATENT DOCUMENTS

| | | | |
|---|---|---|---|
| 3,353,981 A | 11/1967 | Jacob | 442/136 |
| 4,286,013 A | 8/1981 | Daroga et al. | 442/136 |
| 5,945,186 A * | 8/1999 | Li et al. | 428/36.1 |
| 6,037,279 A * | 3/2000 | Brookman et al. | 442/71 |

FOREIGN PATENT DOCUMENTS

EP 190788 * 8/1986

* cited by examiner

*Primary Examiner*—Terrel Morris
*Assistant Examiner*—John J. Guarriello
(74) *Attorney, Agent, or Firm*—Terry T. Moyer; William S. Parks

(57) ABSTRACT

This invention relates to novel airbag coating compositions and systems comprising pre-expanded or non-expandable microspheres that provide effective insulation for the target airbag fabric during exothermic inflation. The inventive airbag fabrics are either pre-calendered prior to application of this composition or are coated through a gap (floating) knife method with such heat-expandable microsphere-containing compositions. The coated airbag fabrics and cushions may then be heated to evaporate the solvent within the coating composition. The resultant fabric thus exhibits the presence of the microsphere constituents of the coating compositions both within the interstices between the individual yarns of the fabric and over the raised yarns of the fabric. Such a coating system thus provides an extremely high degree of protection from heat exposure that permits structural integrity of the target airbag cushion airbag and provides protection from such high inflation temperatures to a vehicle passenger cushion during such a highly exothermic inflation event. The method of forming such specific airbag coating systems on airbag fabrics is also encompassed within this invention.

6 Claims, No Drawings

AIRBAG COATINGS COMPRISING MICROSPHERES PROVIDING IMPROVED THERMAL RESISTANCE

FIELD OF THE INVENTION

This invention relates to novel airbag coating compositions and systems comprising pre-expanded or non-expandable microspheres that provide effective insulation for the target airbag fabric during exothermic inflation. The inventive airbag fabrics are either pre-calendered prior to application of this composition or are coated through a floating knife method with such heat-expandable microsphere-containing compositions. The coated airbag fabrics and cushions may then be heated to evaporate the solvent within the coating composition. The resultant fabric thus exhibits the presence of the microsphere constituents of the coating compositions both within the interstices between the individual yarns of the fabric and over the raised yarns of the fabric. Such a coating system thus provides an extremely high degree of protection from heat exposure that permits structural integrity of the target airbag cushion airbag and provides protection from such high inflation temperatures to a vehicle passenger cushion during such a highly exothermic inflation event. The method of forming such specific airbag coating systems on airbag fabrics is also encompassed within this invention.

BACKGROUND OF THE INVENTION

Airbags for motor vehicles are well known and have been used for a substantial period of time. These devices are installed on the driver and passenger side of automobiles, as well as on the sides of both the front and rear compartments of vehicles (i.e., side airbags) and, in the event of a collision, are rapidly inflated with gas to act as an energy absorbing barrier between the driver or passenger and the steering wheel, dashboard, windows, or interior sides of the automobile. Such airbags (a.k.a., airbag cushions) must meet several important criteria. Included in this list are the ability to inflate quickly (within 0.1 seconds) after a collision event, the ability to rapidly deflate at a uniform rate (such as for front-seat airbags to provide a relatively soft cushion), the ability to retain inflation pressure for a relatively long duration (such as for at least 7 seconds for side airbags during rollover collisions), the ability to retain seam integrity over the target airbag fabric or cushion during and after an inflation event, and, possibly of greatest importance, the ability to withstand extremely high inflation pressures and temperatures during and after a collision event. This last issue concerns the utilized fabric's structural integrity and thus its performance within an airbag cushion during a collision. Sodium azide has been the prominent inflation chemical utilized within standard airbag cushions for many years. In essence, upon collision, the inflation canister ignites the sodium azide (which is, in its pure form, highly toxic to humans) creating a small explosion forcing the released gas into the area of lowest pressure. In such an instance, the uninflated airbag cushion provides the escape route for such gas during the explosion. Thus, the airbag cushion inflates providing the protection for the driver or passenger as noted above. This entire inflation step occurs in about 0.1 seconds from the time of the collision event. In order to produce such a rapid inflation, the explosion produces a tremendous amount of heat within the inflation assembly, which also includes within the airbag cushion itself. Thus, the utilized airbag fabric must be able to withstand such large temperature variations and such exposure to heat without losing its ability to protect the driver or passengers.

There has been a recent movement away from sodium azide (due to its high toxicity, among other reasons) as the explosion ignition chemical utilized within airbag inflation assemblies. Although such a chemical may prove quite damaging to humans, it has, in the past, also provided a method of quick inflation for airbag cushions that required relatively low inflation temperatures (about 1200° F.). New ignition chemicals, such as nitrocellulose-based compounds, have proven safer from a toxicity standpoint and less expensive to utilize, but these also produce extremely exothermic reactions. The use of nitrocellulose inflators (which do not need to be filtered as do the sodium azide-containing types) represents an improvement from a cost perspective over the sodium azide technology, but these unfortunately also produce even greater temperatures during deployment (about 2000° F.).

In view of this movement away from sodium azide, modifications of airbag fabrics and cushions are now necessary to protect the structural integrity of such fabrics and cushions during such an extremely high-temperature inflation event. Some thought has been given to utilizing higher denier yarns (i.e., 515, 630, and greater) to provide greater heat capacities for the target fabrics. However, such higher denier materials also create greater packed volumes for such target airbag cushions and increase the costs of manufacture for such airbag fabrics and cushions as to offset the savings provided through the use of a new inflation assembly. Thus, in order to benefit from the cost reductions associated with utilizing nitrocellulose inflator assemblies, there is a desire to utilize lower denier yarns (i.e., up to about 420 denier) with modified coatings to provide the necessary heat resistance. Such coatings must also provide the same performance standards as noted above for different airbag cushions (i.e., quick inflation, long-duration inflation, etc.). To date, there has been no discussion of altering prior well-known airbag fabric coating compositions to compensate for this potential change from low-temperature sodium azide-containing inflation assemblies to those comprising chemicals which produce much higher temperature (about 2000° F.) explosions and inflations.

In the past, coatings have been applied to fabrics intended for use in automotive airbags, both to resist the unwanted permeation of air through the fabric and to protect the fabric from detriment by the hot gases used to inflate the bags. Polychloroprene was the polymer of choice in the early development of such a product; however, the desire to decrease the folded size of the completed airbag, and the tendency of polychloroprene to degrade upon exposure to heat and release the components of hydrochloric acid (thereby potentially degrading the fabric component as well as releasing hazardous chemicals), has led to the acceptance of other coating compounds. Such compounds include silicone (polydimethylsiloxane, as merely one example), polyurethane, other rubber compositions, and the like. Such compositions have been well known as providing the desired permeability characteristics for such target airbag fabrics and cushions as well as temperature protection from the heat generated by sodium azide inflation explosions. However, and again, as noted above, there has been no teaching nor fair suggestion of any improvements in temperature protection for higher temperature, less expensive, and less toxic to humans, inflation chemicals within airbag inflation assemblies.

DESCRIPTION OF THE INVENTION

Although silicones and neoprene have been the predominant coatings utilized in the airbag industry traditionally, as noted above, it has been determined that these coatings exhibit certain shortcomings when exposed to the high temperatures associated with the unfiltered, non-sodium azide inflation assemblies. For example, since a complete coating (over the raised yarns of such airbag fabrics and within the interstices between such yarns) is necessary to effectuate the proper high temperature protection during an inflation event, large amounts of (expensive) silicones would be required. Also, low amounts of silicone elastomers do not provide the same heat resistance as thicker compounds. Thus, a composition of low amounts (cost-effective) of silicones which completely coats the desired airbag fabric is necessary. Unfortunately, the prior art has not accorded the industry such a coating system. Neoprene degrades very easily and thus does not exhibit sufficient aging stability. Furthermore, very thick coatings of such rubber compounds are required to provide the necessary coating to protect against increased inflation temperatures. These thick coatings result in much higher costs, which, when coupled with the lack of aging stability, makes neoprene alone a highly undesirable coating component. There clearly exists a need in the airbag coating art to provide a cost-effective, temperature-resistant coating system to meet these challenges.

It is thus an object of the invention to provide such a coating system. Another object of the invention has been to provide a cost-effective airbag coated fabric which can withstand the high temperatures associated with such new inflation assemblies. Yet another object of the invention is to provide an airbag cushion which will insulate a driver or passenger from the heat produced during an inflation event involving such new inflation assemblies. Accordingly, this invention encompasses an airbag fabric, at least a portion of which is coated with a coating composition, wherein said coating composition comprises microsphere materials selected from the group consisting of non-expandable microspheres, pre-expanded microspheres, and mixtures of both, and at least one gas permeability reducing material. Furthermore, this invention encompasses a method of producing a coated airbag fabric comprising the steps of providing an uncoated fabric; coating at least a portion of said fabric with a composition comprising microspheres selected from the group consisting of pre-expanded microspheres, non-expandable microspheres, and mixtures of both, and at least one gas permeability reducing material; said coating step being performed by utilization of a floating knife technique. Additionally, this invention also encompasses a method of producing a coated airbag fabric comprising the steps of (a) providing an uncoated fabric; (b) coating fabric of step "a" with a solvent diluted composition consisting of microspheres selected from the group consisting of pre-expanded microspheres, non-expandable microspheres, and mixtures of both, and a gas permeability reducing material; said coating step performed on a floating knife coater where the coating blade height is greater than the microspheres' greatest diameter; and (c) passing the coated fabric of step "b" through at least heat zone sufficient to evaporate the solvent and cure the gas permeability material.

Such a specific fabric and such specific methods provide the necessary heat insulation and resistance and, when mixed with the gas permeability reducing material, permits a reduction in the amounts of such materials while still providing the requisite characteristics associated with airbag cushions. Basically, the expanded microspheres provide a barrier to by not permitting the conduction of heat through the microsphere layer on the target fabric. Without sufficient surface to conduct the flow of heat from within the airbag cushion through to the outside surface, the high temperatures of the inflation event cannot be transferred to the fabric portion of the composite, thus allowing for the retention of the strength of the fabric.

The term pre-expanded (heat-expanded) or non-expandable microspheres is intended to mean any substantially spherical hollow objects (microballoons, as merely one example) which are either fully expanded or will not appreciably expand in volume upon exposure to heat. Such microspheres are at most 100 micrometers in diameter and are generally comprised of glass, rubber, and the like. Preferred microspheres for utilization within this invention are offered for sale under the tradenames Expancel® (DE or WE grades manufactured by Expancel Inc. of Duluth, Ga.); Q-CEL ((manufactured by the PQ Corporation of Valley Forge, Pa.); and Extendospheres® (also manufactured by The PQ Corporation). To date, there has never been any utilization of such pre-expanded or non-expandable microspheres with airbag fabrics or cushions at all, not to mention to provide the same heat insulation and resistance benefits as discussed above. Such microspheres should be present between the target fabric and the cured gas permeability reducing material in order to provide a heat insulation barrier layer of air. The presence of such a layer thus substantially prevents (and thereby dissipates) conduction of the heat generated during the inflation event.

The term gas permeability reducing material basically encompasses any well-known airbag fabric or cushion coating material that provides a barrier, whether temporarily or permanently, to the gasses generated during an inflation event from moving from the interior of such an enclosure to the outside. Thus, such a material is selected from the group consisting of a silicone-containing compound, a polyurethane, a polyacrylate, a butyl rubber, EPDM, chloroprene, neoprene, a polyamide, an hydrogenated nitrile rubber, an ethylene-vinylacetate copolymer, and any mixtures or dispersions thereof. Silicone-containing materials are most preferred due to their excellent permeability reducing benefits as well as their aging stability. Such materials include, but are not intended as being limited to, polydimethylsiloxane and its derivatives (such as Dow Corning 3625 LSR silicone resin), and any mixtures thereof. From a cost perspective, the polydimethylsiloxanes are most preferred of this group. With regard to the other potential permeability reducing materials, potentially preferred materials include a polyurethane, available from Stahl USA, Peabody Mass., under the tradename Ru 40-350 (40% solids); polyacrylates, (a) available from Rohm & Haas, under the tradename Rhoplex® E-358 (60% solids), (b) available from Shell Chemical Company, Houston, Tex., under the tradename Epi-Rez™ 5520 (60% solids), and (c) available from Parachem Southern, Inc., Greenville, S.C., under the tradename Pyropoly AC 2000™; a polyamide dispersion marketed under the trade designation MICROMID™ 632 hpl by Union Camp Corporation which is believed to have a place of business in Wayne, N.J.; other polyurethane resins, Witcobond™ 253 (35% solids), from C&K Witco, and Sancure, from B F Goodrich, Cleveland, Ohio; hydrogenated NBR, such as Chemisat™ LCD-7335X (40% solids), from Goodyear Chemical, Akron, Ohio; and butyl rubber, such as Butyl rubber latex BL-100, from Lord Corporation. As noted above, mixtures or combinations of non-silicone materials may also be utilized such as a dispersion of polyurethane and polyacrylate, as merely an example. Potentially preferred compositions are noted below including dispersions comprising polyurethane and polyacrylate. Preferably, in such an instance, the ratio of polyurethane to polyacrylate should be in an amount of from about 0.1:1 to about 10:1; preferably from about 1:1 to about 8:1; more preferably from about 2:1 to about 5:1; and most preferably from about 2:1 to about 2.5:1. The add-on weight of this mixture of microspheres and permeability reducing material is from about 0.2 to about 2.0 ounces per square yard of the target fabric, preferably this add-on weight is from about 0.3 to about 1.5, most preferably about 0.8.

The substrate across which the cross-linked elastomeric resin coatings are applied to form the airbag base fabric in accordance with the present invention is preferably a plain woven fabric formed from yarns comprising polyamide, polyester, or blends of such fibers. Such yarn preferably has a linear density of about 100 denier to about 840 denier, preferably in the range of 210 denier to 420 denier. Such yarns are preferably formed from multiple filaments wherein the filaments have linear densities of about 6 denier per filament or less and most preferably about 4 denier per filament or less. Such substrate fabrics are preferably woven using rapier looms or possibly through the utilization of fluid jet weaving machines as disclosed in U.S. Pat. Nos. 5,503,197 and 5,421,378 to Bower et al. (incorporated herein by reference). The fabric substrate with applied coating system will hereinafter be referred to as an airbag base fabric. Other possible components present within the microsphere-containing coating composition are solvents (such as water, volatile alcohols, ketones, aromartics and the like), thickeners, antioxidants, flame retardants, curing agents, coalescent agents, adhesion promoters, and colorants. Any well known thickener for airbag coatings (such as those comprising silicones, polyurethanes and/or polyacrylates) may be utilized in this invention. One potentially preferred thickener is marketed under the trade designation NATROSOL™ 250 HHXR by the Aqualon division of Hercules Corporation which is believed to have a place of business at Wilmington, Del. Also, in order to meet Federal Motor Vehicle Safety Standard 302 flame retardant requirements for the automotive industry, a flame retardant is also preferably added to the compounded mix. Any well known airbag flame retardant may be used (including aluminum trihydrate, as merely one example). One potentially preferred flame retardant is DE-83R, 70% Dispersion marketed by Great Lakes Chemical.

The implementation of such a layer of beneficial microspheres is not a simple task. It has been determined that the application of such microsphere-containing airbag coating compositions to the target airbag base fabrics in order to produce the desired heat insulation and resistance characteristics discussed above must be performed with specific procedures. Thus, once compounding is complete (and the preferable resultant dispersion possesses a viscosity of about 8,000–50,000 centipoise), the composition of microspheres and gas permeability reducing material may be applied in three different ways. First, the composition may be applied by any standard coating procedure such as, and not limited to, scrape coating. This term includes, and is not limited to, knife coating, in particular knife-over-gap table, floating knife, knife-over-roll, and knife-over-foam pad methods, to name a few different method types. However, in order to effectuate the desired coating on the target fabric surface, the fabric must first be calendered (flattened) such that the valley to peak distance of the interstitial spaces to the apex of the raised yarns is not greater than about 10 microns, preferably less than 8 microns, and most preferably less than 7 microns. The second method involves the utilization of an uncalendered fabric that may be coated through a specific floating knife procedure with the solvent diluted microsphere-containing composition. It has been determined that the utilization of airbag coating compositions comprising microspheres and gas permeability reducing materials on uncalendered fabrics using standard scrape-coating techniques will not provide the desired heat insulation or heat resistance since the migrate to the yarn interstices and leave the tops of the yarn bundles unprotected. Thus, the second method permits the application of microspheres on the airbag base fabric surface with the floating knife adjusted to a height which permits the application of at least one layer of such (substantially fully expanded) microsphere material. Upon solvent evaporation, the coating weight and thickness will be reduced without removing material form the tops of the yarn bundles. If the knife is set a too low a height the microspheres will not be aligned correctly on the fabric surface and, in fact, the knife will not spread the composition but may actually drag the microspheres over the contacted portion of the fabric. This would leave the gas permeability reducing material on the fabric surface with little if no microsphere components. In each of these methods, the resultant airbag base fabric is substantially impermeable to air when measured according to ASTM Test D737, "Air Permeability of Textile Fabrics," standards.

Such specific procedures must be followed in order to permit full coverage of both the interstitial spaces between the fabric yarns as well as the raised yarns of the same substrate. If the raised yarns are not sufficiently covered, the structural integrity of the fabric will most likely be compromised during the highly exothermic inflation event. Substantial weakening of the yarns at any location on the fabric will result in a loss of strength for the overall composite structure. Thus, the entire coated portion of the target fabric must be sufficiently protected by the insulating microspheres. Generally, the coating of a fabric with such microsphere-containing compositions would result in the movement (due to contact of the coating blade, cohesion, gravity, and other forces upon the microspheres themselves) of such a coating composition from the raised yarn portions of the fabric into the interstitial spaces between such yarns. This problem is magnified when the peak to valley distance is too disparate (i.e., the slope angle of the raised yarns measured from the midline of the fabric to the apex of the raised yarns are relatively large) since the microspheres will easily "slide" into the interstitial spaces between the yarns in such an instance. This prevents sufficient contact of the microspheres with the raised yarns to impart the necessary heat insulation and resistance.

Thus, the first method noted above initially produces a fabric with very low thickness and thus very little variation in thickness over the entire substrate. In such a manner, the slope angle and height of the raised yarns (corresponding to the midline of the fabric) are relatively low. As a result, the microspheres will not easily migrate into the interstitial spaces and will most likely remain over the raised yarns. The second method permits coverage of the fabric with solvent diluted compositions containing either pre-expanded or non-expanding microspheres or both wherein the floating knife mechanism is set at a height above the target fabric greater than the thickness of the microsphere-containing composition (i.e., at a height greater than the greatest diameter of the utilized microspheres). In such a manner, a thin coating may be applied evenly over the target fabric including such types of microspheres that can fill the interstitial spaces as well as sufficiently cover the raised yarns.

As previously indicated, the substrate fabric is preferably a woven nylon material. In the most preferred embodiment such substrate fabric will be formed from fibers of nylon-6,6 woven on a rapier, water-jet, or air-jet loom. It has been found that such polyamide materials exhibit particularly good adhesion and maintenance of resistance to hydrolysis when used in combination with the coating according to the present invention.

DETAILED DESCRIPTION OF THE INVENTION AND THE PREFERRED EMBODIMENTS

In order to further describe the present invention the following nonlimiting example is set forth. This example is provided for the sole purpose of illustrating some preferred embodiments of the invention and are not to be construed as limiting the scope of the invention in any manner. In order to determine the thermal resistance measurements of the inventive coated airbag fabrics, as well as other uncoated and/or commonly coated, a heat resistance test method was developed. This procedure utilized a precisely controlled jet of heated air, which impinged on the fabric in a controlled and reproducible manner. A nozzle (0.0625" in diameter) produced an airflow of 15 scfh (standard cubic feet per hour) at a pressure of 20 psi (pounds per square inch). The air was heated through the nozzle to 1005° F. and fabric samples (4" by 8") were clamped coated-side up below the nozzle so that the nozzle is 0.0625" above the fabric. As the nozzle traversed the fabric at a rate of 1 inch per second, the fabric was scored by the hot air. The tensile strength of of the fabric was then determined and compared to fabric that had not been heat-treated.

EXAMPLE 1

An uncoated nylon 6,6 woven airbag fabric of 420 denier was coated with a composition consisting of 71 parts toluene, 21 parts silicone resin (Dow Corning 4-7224, containing polydimethyl siloxane, with curing agents, such as benzoyl peroxide, and flame retardants, such as alumina trihydrate, added), and 8 parts heat-expanded microspheres (Expancel® 551 DE). The coating was performed through utilization of a gap (floating) knife coater where the coating blade was set at least 30 microns above the fabric surface. The fabric then passes through a heat zone at about 65° C. to evaporate the toluene solvent and a second heat zone of 170° C. to cure the silicone. The total add-on weight of the coating composition was about 0.8 ounces per square yard of fabric. The retained strength after heat exposure was about 78% whereas a control fabric with no microspheres added but with the same amount of and type of silicone resin present exhibited a much lower heat retention of 48%.

EXAMPLE 2

An uncoated nylon 6,6 woven airbag fabric of 420 denier was coated with a composition consisting of 70 parts toluene, 20 parts silicone resin (Dow Corning 4-7224, containing polydimethyl siloxane, with curing agents, such as benzoyl peroxide, and flame retardants, such as alumina trihydrate, added), and 10 parts glass microspheres (Q-CEL® 2106 from The PQ Corporation). The coating was performed through utilization of a gap (floating) knife coater where the coating blade was set at least 30 microns above the fabric surface. The fabric then passes through a heat zone at about 65° C. to evaporate the toluene solvent and a second heat zone of 170° C. to cure the silicone. The total add-on weight of the coating composition was about 0.8 ounces per square yard of fabric. The retained strength after heat exposure was about 65% whereas a control fabric with no microspheres added but with the same amount of and type of silicone resin present exhibited a much lower heat retention of 48%.

There are, of course, many alternative embodiments and modifications of the present invention, which are intended to be included within the spirit and scope of the following claims.

What We claim is:

1. An airbag comprising a fabric comprising a plurality of yarns, said fabric exhibiting raised yarns and interstices between said raised yarns, wherein at least a portion of said fabric is coated with a coating composition comprising microsphere materials selected from the group consisting of pre-expanded microspheres, non-expandable microspheres, and any mixtures thereof, and at least on gas permeability reducing material; wherein the total add-on weight of said coating composition is at most 1.5 ounces per square yard of the fabric; wherein said coating composition is applied primarily on said raised yarns of said fabric; and wherein the heat retention of said fabric is eater than that for the same coating composition but free from said microsphere materials.

2. The airbag of claim 1 wherein said fabric is comprised of fibers selected from the group consisting of polyester, polyamide, and any mixtures thereof; and said fabric structure is selected from the group consisting of woven and knit structures.

3. The airbag of claim 1 wherein said at least one gas permeability reducing material is selected from the group consisting of a silicone-containing compound, a polyurethane, a polyacrylate, a butyl rubber, EPDM, chloroprene, neoprene, a polyamide, an hydrogenated nitrile rubber, an ethylene-vinylacetate copolymer, and any mixtures or dispersions thereof.

4. An airbag comprising a fabric comprising a plurality of yarns, said fabric exhibiting raised yarns and interstices between said raised yarns, wherein at least a portion of said fabric is coated with a coating composition comprising microsphere materials selected from the group consisting of pre-expanded microspheres, non-expandable microspheres, and any mixtures thereof, and at least one gas permeability reducing material; wherein said fabric is calendared to a degree such that the valley to peak distance of said interstices to the apex of said raised yarns is not greater than about 10 microns; and wherein the heat retention of said fabric is greater than that for the same coating composition but free from any of said microsphere materials.

5. The airbag of claim 4 wherein said fabric is comprised of fibers selected from the group consisting of polyester, polyamide, and any mixtures thereof; and said fabric structure is selected from the group consisting of woven and knit structures.

6. The airbag of claim 4 wherein said at least one gas permeability reducing material is selected from the group consisting of a silicone-containing compound, a polyurethane, a polyacrylate, a butyl rubber, EPDM, chloroprene, neoprene, a polyamide, an hydrogenated nitrile rubber, an ethylene-vinylacetate copolymer, and any mixtures or dispersions thereof.

* * * * *

UNITED STATES PATENT AND TRADEMARK OFFICE
CERTIFICATE OF CORRECTION

PATENT NO. : 6,576,574 B2
DATED : June 10. 2003
INVENTOR(S) : Andrew D. Child and Derek S. Kazlowski It is certified that error appears in the above-identified patent and that said Letters Patent is hereby corrected as shown below:

Column 8,
Line 18, after the word "least" delete "on" and insert -- one --.
Line 23, after the word "is" delete "eater" and insert -- greater --.

Signed and Sealed this

Twenty-first Day of September, 2004

JON W. DUDAS
*Director of the United States Patent and Trademark Office*